(12) United States Patent
Kleeberger et al.

(10) Patent No.: US 12,659,727 B2
(45) Date of Patent: Jun. 16, 2026

(54) VEHICLE, DEVICE, COMPUTER PROGRAM AND METHOD FOR LOADING DATA

(71) Applicant: Infineon Technologies AG, Neubiberg (DE)

(72) Inventors: Veit Kleeberger, Kaufering (DE); Alexander Zeh, Munich (DE)

(73) Assignee: Infineon Technologies AG, Neubiberg (DE)

( * ) Notice: Subject to any disclaimer, the term of this patent is extended or adjusted under 35 U.S.C. 154(b) by 217 days.

(21) Appl. No.: 18/494,431

(22) Filed: Oct. 25, 2023

(65) Prior Publication Data

US 2024/0155336 A1    May 9, 2024

(30) Foreign Application Priority Data

Nov. 7, 2022    (DE) .......................... 102022129350.5

(51) Int. Cl.
*H04L 29/06*    (2006.01)
*G07C 5/00*    (2006.01)
*H04W 12/03*    (2021.01)

(52) U.S. Cl.
CPC ............ *H04W 12/03* (2021.01); *G07C 5/008* (2013.01)

(58) Field of Classification Search
CPC ..... H04W 12/03; H04W 12/06; G06F 21/572; G06F 21/575; G06F 21/64; G07C 5/008
See application file for complete search history.

(56) References Cited

U.S. PATENT DOCUMENTS

| | | | |
|---|---|---|---|
| 2015/0012737 A1 | 1/2015 | Newell | |
| 2018/0198818 A1* | 7/2018 | Andrews | ................. H04L 67/02 |
| 2020/0226264 A1 | 7/2020 | Xu et al. | |
| 2022/0182248 A1 | 6/2022 | Lin et al. | |
| 2022/0350891 A1 | 11/2022 | Bulmus et al. | |
| 2023/0214494 A1* | 7/2023 | Yamazaki | ............. G06F 9/4401 |
| | | | 713/2 |
| 2024/0022604 A1* | 1/2024 | Radhakrishnan | ....... H04L 63/20 |

* cited by examiner

*Primary Examiner* — Joseph P Hirl
*Assistant Examiner* — Chi D Nguy
(74) *Attorney, Agent, or Firm* — Harrity & Harrity, LLP

(57) ABSTRACT

The present disclosure relates to a vehicle, a device, a computer program and a method for loading data, e.g., during a boot-up process. The method includes a reception of at least one character string for the verification of data. The method further includes a verification of data, wherein the verification of data includes a comprehensive check of the entire character string. The method further provides for a loading of data based on the check of the character string.

17 Claims, 4 Drawing Sheets

10

Reception of at least one character string for the verification of data ⌐ 11

Verification of data ⌐ 12

Loading of data ⌐ 13

10

VEHICLE, DEVICE, COMPUTER PROGRAM AND METHOD FOR LOADING DATA

CROSS-REFERENCE TO RELATED APPLICATION

This application claims priority to German Patent Application No. 102022129350.5 filed on Nov. 7, 2022, the content of which is incorporated by reference herein in its entirety.

TECHNICAL FIELD

The present disclosure relates to a vehicle, a device, a computer program and a method for loading data. In particular, but not exclusively, example implementations of the present disclosure relate to a concept for loading data during a boot-up process.

BACKGROUND

Nowadays, secure boot-up processes assume a key role in automobile electronics, and in other technical applications in which functionalities are substantially software-defined. Software must be sufficiently protected against manipulation, such that a desired functionality can be guaranteed and any introduction of malware prevented.

The security of a (secure) boot-up process is dependent upon that part of a system which it is necessary to compromise in order to introduce a further functionality, and upon the complexity associated with the execution of such a modification (also described as "attack feasibility"). If it is necessary for multiple elements to be compromised, or to be disrupted in a particular sequence, the feasibility of the successful introduction of a malicious software is reduced.

Existing security mechanisms provide, for example, for the application of a proof-of-work (PoW, pluralized as PoWs). A PoW is a form of cryptographic evidence, using which it can be demonstrated that a specific computational constraint has been deployed. This concept was originally introduced as a form of protection against denial-of-service attacks, wherein an entity which is requesting a specific service is required to complete a PoW. A PoW thus reduces the attack feasibility of a service delivered, as an attacker is required to expend more time for the formulation of a permissible query.

In some applications, however, a reduced, or more effectively scalable attack feasibility is desirable. There is thus a requirement for an improved concept for the loading of data, e.g., during a boot-up process.

This requirement is addressed by the attached independent claims. Advantageous further developments are the subject matter of the dependent claims.

SUMMARY

Example implementations of the present disclosure provide a method for loading data, e.g., during a boot-up process. The method includes a reception of at least one character string for the verification of data. The method further includes a verification of data. Verification of data includes a comprehensive check of the entire character string. The method further provides for a loading of data, based on the check of the character string. By the comprehensive checking of the entire character string, the proposed method provides a reduced attack feasibility, in comparison with other security mechanisms, e.g., those based upon a PoW.

In some example implementations, the character string includes a cryptographic key (also described as a "key" only, in conjunction with the present context) and/or at least one predefined value for the verification of data. This permits application, for example, in conjunction with cryptographic encryption methods and/or other arbitrary security mechanisms.

Additionally, or alternatively, the character string includes a data-specific hash value. Correspondingly, the checking of booting information can include a comprehensive check of the hash value. In practice, this can permit an even lower attack feasibility.

Optionally, the hash value, based on a cryptographic data key, can generate data information and/or configuration information with respect to data.

In some example implementations, the comprehensive check of the character string includes a check as to whether the character string fulfils a predefined condition. The loading of data can then proceed, if this condition is fulfilled.

In practice, the predefined condition can be a condition for the result of a predefined function which is applied to the entire character string.

This condition is then fulfilled, for example, if the result corresponds (exactly) to a comparative value. Optionally, this condition can also be fulfilled, if the result deviates from a predefined comparative value for the result by no more than a predefined deviation.

The predefined condition includes, for example, a condition for a total number of a predefined character in the character string and/or a number of characters of the character string within a predefined character group.

Optionally, the predefined function includes a function for determining the Hamming weight of the character string. The predefined condition is then fulfilled, for example, if the Hamming weight corresponds to a predefined value.

In some example implementations, the method further includes a verification of the character string by reference to a proof (e.g., a PoW) of resources associated with the generation of the character string. This permits a more flexible scalability of attack feasibility and the incorporation of physical properties, as described in greater detail hereinafter.

Proof is executed, for example, to the effect that the character string includes a predefined number of a predefined character.

In some example implementations, the method can be executed in a vehicle. Data can thus be provided for operating a component of the vehicle. As a result, the integrity of data for the operation of the vehicle can be increased. Accordingly, this can result in an improved operational security of the vehicle associated with the employment of data.

Further example implementations provide a computer program including commands which, upon the execution of the program by a computer, initiate the execution by the latter of the method/steps of a method according to the present disclosure.

Other example implementations provide a device for loading data, e.g., during a boot-up process. The device includes one or more communication interfaces and a data processing circuit which is configured, by the employment of the one or more interfaces, to execute the method according to the present disclosure.

The data processing circuit can include a memory for storing a computer program for executing the method according to the present disclosure.

In some example implementations, the memory can be configured as a read-only memory. In comparison to other memories, e.g., write-accessible memories, this handicaps any manipulation of memory content. In practice, this can provide a higher degree of security.

In practice, the device can further include a digital memory, having one or more electronic fuses, for storing a reference for checking the character string. Electronic fuses can be configured such that they can only be tripped in an irreversible manner, such that any manipulations of electronic fuses, which are detectable using the reference, are less easy to conceal.

The proposed concept can be applied, in particular, in the automobile sector, e.g., for the protection of vehicles.

Example implementations therefore relate to a vehicle including a device according to the present disclosure.

BRIEF DESCRIPTION OF THE DRAWINGS

A number of examples of devices and/or methods are described in greater detail hereinafter, for example purposes only, with reference to the attached figures. In the figures.

DETAILED DESCRIPTION

Figure 1:
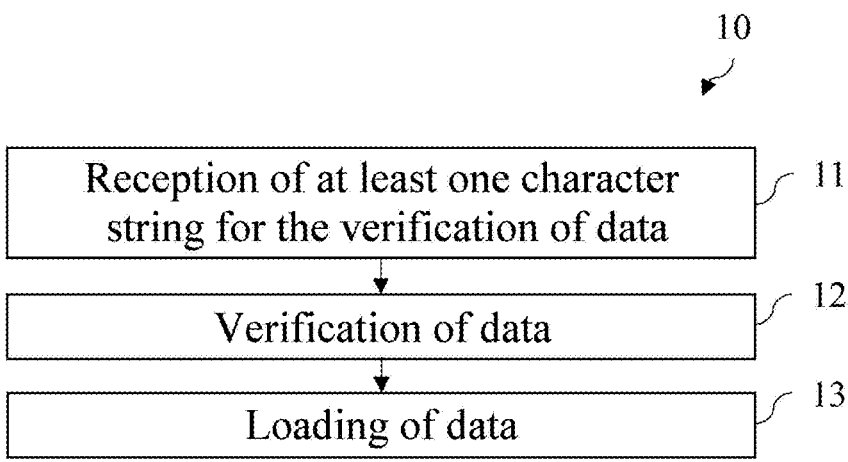
FIG. 1 shows a flow diagram for the schematic representation of an example implementation of a method for loading data during a boot-up process.

A number of examples will now be described in greater detail with reference to the attached figures. However, further potential examples are not limited to the features of the implementations which are described in detail. These can comprise modifications of features, together with correspondences and alternatives to the features. Moreover, terminology employed herein for the description of specific examples is not restrictive with respect to further potential examples.

In the entire description of the figures, identical or similar reference symbols refer to identical or similar elements or features, which can be implemented in a respectively identical or modified form, whilst delivering an identical or similar function. In the figures, moreover, thickness of lines, layers and/or regions can be exaggerated, for the purposes of illustration.

If two elements A and B are combined by the employment of "or", it is to be understood that all potential combinations are disclosed, e.g., only A, only B, or A and B, unless expressly defined otherwise in an individual case. As an alternative wording for the same combinations, "at least one of A or B" or "A and/or B" can also be employed. This applies, in an equivalent manner, to combinations of more than two elements.

Where a singular form is used, e.g., "a" or "the", and the employment of only a single element is not defined as mandatory, either explicitly or implicitly, further examples can also employ multiple elements for the implementation of the same function. Where a function is described hereinafter as being implemented by the employment of multiple elements, further examples can implement the same function by the employment of a single element or a single processing entity. It is further understood that the terms "includes", "including", "comprises" and/or "comprising", the employment whereof describes the presence of features, whole numbers, steps, operations, processes, elements or components disclosed, and/or of a group thereof, do not exclude the presence of addition of one or more further features, whole numbers, steps, operations, processes, elements or components, and/or of a group thereof.

The term "boot-up" process or "booting" (from the verb "to boot"), signifying a run-up, start-up or bootstrapping, describes the loading of an operating system of a computer, or of another device, which generally proceeds further to powering up. The term "booting" is a contraction of the term "bootstrap loading", corresponding to loading using a "bootstrap". The boot-up process of a device customarily proceeds in multiple stages. After powering up, firstly, a simple program is scanned from a small read-only memory (ROM). This program permits a start-up of a more complex program, which then starts up, for example, an operating system. The more complex program can be verified using a (cryptographic) key. As per other processes for the loading of data, the key might be susceptible to manipulation during the boot-up process, for the purposes of manipulation or the illicit introduction of malware. Consequently, there is a need for an improved concept for loading data, e.g., during a boot-up process. Moreover, in some applications, there is a need for greater flexibility in the scaling of attack feasibility. Example implementations of the present disclosure, which address the above-mentioned requirements, are described in greater detail hereinafter with reference to the attached figures, for example purposes.

FIG. 1 shows a flow diagram for the schematic representation of an example implementation of a method 100 for loading data, e.g., during a boot-up process. Data can comprise any type of data or information. In a boot-up process, for example, data can comprise a software/source code/computer program, which is to be loaded in conjunction with the boot-up process. In general, however, data can also include any other information.

The method 100 comprises a reception 110 of at least one character string for the verification of data. To this end, the character string is loaded from a corresponding memory, in which it is saved. For protection, the memory can be secured against illicit manipulations.

In the context of the present disclosure, a character string can be understood as a character chain, a character series or a string comprised of a finite sequence of characters (e.g., letters, numbers, special characters and control characters from a specific character set). The character string thus comprises, for example, a finite sequence of sequential places, each occupied by such a character. A person skilled in the art who employs the present disclosure will appreciate that, in practice, the character string can comprise any (digital) information which is appropriate for the verification of data. In practice, the character string can comprise a cryptographic key or data (e.g., software). In some example implementations, in the interests of enhanced security, the character string can also comprise an encrypted form of the cryptographic key or data.

The method 100 further comprises a verification 120 of data. Verification of data can be understood as a validation process wherein a check is executed as to whether data are trustworthy or untrustworthy, in order to prevent any loading of untrustworthy or harmful data, e.g., malware. Verification 120 of data involves a comprehensive check of the entire character string. Checking thus includes each character or each place in the character string. Accordingly, each of the characters is considered in the checking of the character string. In comparison with conventional boot-up processes, e.g., boot-up processes in which, in the context of a PoW, only a number of leading zeros is checked, and the check is interrupted in responses to the first character which is not equal to zero, this provides greater security against attacks.

Whereas, in the case of a PoW, manipulations in which the number of leading zeros is not altered remain undetected, conversely, modifications to the character string can be identified or detected by comprehensive checking. The proposed concept thus reduces attack feasibility, without essentially compromising the boot-up process. In practice, by the application of the proposed concept, attacks can be more easily detected and prevented. This handicaps, for the example, the introduction of malware during the boot-up process by the manipulation of a key for checking against malware.

The method 100 further comprises a loading 130 of data based on the checking of the character string. It can thus be established whether data are trustworthy. Loading of data only proceeds, for example, if the verification of data by reference to the character string has been successful, e.g., if data have been classified as trustworthy in the context of verification by reference to the character string. Conversely, if it proceeds from this verification that data are untrustworthy, the loading of data can be abandoned.

Further aspects and features of the proposed method 100 are described in greater detail hereinafter, with reference to the further figures.

As described in greater detail hereinafter, there are various approaches to the realization of the proposed method 100.

Figure 2:
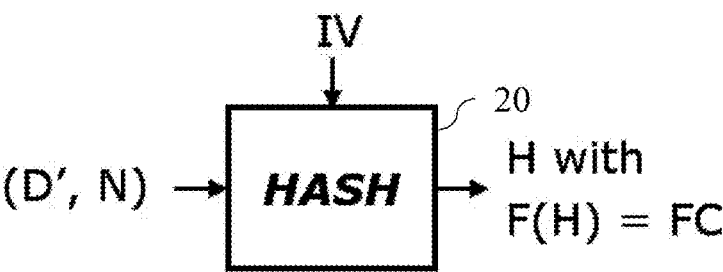
FIG. 2 shows a flow diagram for the schematic representation of a further example implementation.

FIG. 2 shows a schematic representation of an example implementation according to a first methodical approach, wherein a hash value H is employed as a character string for verification. In the interests of clearer understanding, the example implementation is described hereinafter with reference to an example application of the proposed method 100 to a boot-up process. It should be observed, however, that the method 100 can also be employed in general in other applications for the verification of data.

In the present example implementation, data are identified as D'. In the present case, data D' are user data, e.g., a software/source code which is to be loaded in conjunction with a boot-up process. In the case of an application in a vehicle, for example, data D' comprise a software or other data for operating a component of the vehicle, for example a braking or steering system. Alternatively, or additionally, a cryptographic key, data information (e.g., meta-information on user data) and/or configuration data can also be employed for this purpose. A person skilled in the art will appreciate that the proposed concept is applicable for all cryptographic keys, e.g., both keys for asymmetric encryption and keys for symmetric encryption.

In the present case, the character string is generated based on data D'. The character string is, for example, a specific hash value H for data D'. For the generation of the hash value H, a hash function 20 is applied to data D'. Specifically, the hash function 20 is applied to a data packet comprising data D' and assuming a predefined value N. The value N can also be understood as a "nonce" even if, in practice, unlike a nonce, the value N can be re-employed for the generation of the character sequence. Moreover, an initialization vector (IV) is employed for the generation of the hash value. In the application of the IV, for example, a first plain text block of the data packet or data D' received is linked to the IV by a XOR association. For secure encryption, in the example implementations, the IV can comprise a block of random data.

For the verification of data D', the hash value H can then be comprehensively checked prior to the loading of data D', according to the proposed method 100. The hash value H is checked, for example, for a predefined property, which is dependent upon each of the characters of the hash value, e.g., a property to which each of the characters contributes. The property is therefore configured such that it is modified, immediately one of the characters is modified.

In the present example, the property e.g., is defined by, or is dependent upon the fulfilment of a predefined condition by the hash value 20. Whether or not the hash value fulfils this condition can be dependent upon an individual character of the hash value which occupies an arbitrary place in the hash value. Loading of data D' then proceeds, for example, only if the condition is fulfilled.

In the present case, the predefined condition is or comprises, for example, a condition with respect to the result of a predefined function F(H) which is applied to the entire character string. Accordingly, this condition can also be considered as a functional condition or "functional constraint" (FC), and verification by reference to the functional constraint considered as a "proof of function" (PoF). A person skilled in the art will appreciate that any arbitrary function can be applied which considers each character in the hash value, e.g., the result of which is dependent upon each character in the hash value. In the present case, the function F(H), for example, is a function for determining the Hamming weight of the hash value H. The predefined condition is then fulfilled, for example, if the Hamming weight F(H) corresponds to a predefined value for the FC. The FC, in the context of the present implementation, is also to be understood as the predefined value for the functional constraint. Accordingly, N can thus be selected such that the condition is fulfilled.

Checking of the character string thus involves, for example, an application of the function F for the determination of the Hamming weight F(H) of the hash value H, and a comparison of the Hamming weight F(H) with the value according to the functional constraint FC. Data D' are then classified as trustworthy, and are loaded, if F(H)=FC. Otherwise, data D' will not be classified as trustworthy. In this case, any loading of data D' will be abandoned, in order to prevent any loading of malware in conjunction with the boot-up process.

A person skilled in the art will appreciate that, in practice, the function can be, or can comprise a different function. The function is, or comprises, for example, a function for deter-
mining a total number of zeros, or of another predefined
character. Optionally, the condition comprises a condition
for a number of characters of the character string within a
predefined character group. In example implementations in
which the character string is non-binary and comprises
characters from a character group (or field) of size q (e.g.,
1, . . . , q), the function can be e.g., a function for determining
a total number of characters which are greater/smaller than
(equal to) q/2. This condition can then be fulfilled in each
case, if the total number corresponds to a predefined value.

Optionally, the condition can accommodate a predefined
deviation from the result. The condition is fulfilled, for
example, if the result deviates from a predefined compara-
tive value for the result by no more than a predefined
deviation. With reference to the present example, data D' are
thus also classified as trustworthy, for example, if the result
deviates from the predefined value by no more than the
predefined deviation. This condition can be fulfilled, for
example, for all hash values H=(H', H''), wherein H'' is a
consistently permissible "ECC-parity" (ECC: Error Correct-
ing Code) tuple of H'. H' are hash values which precisely/
exactly fulfil the predefined condition, whereas H'' only
fulfil the condition in consideration of the permissible devia-
tion. With reference to the example implementation speci-
fied, for example, a permissible deviation of 1 from the FC
value can be provided. A person skilled in the art will
appreciate that the deviation can be arbitrarily adjusted, in
accordance with security requirements.

As described in greater detail hereinafter with reference to
FIG. 3, the method 100 can also comprise a PoW.

Figure 3:
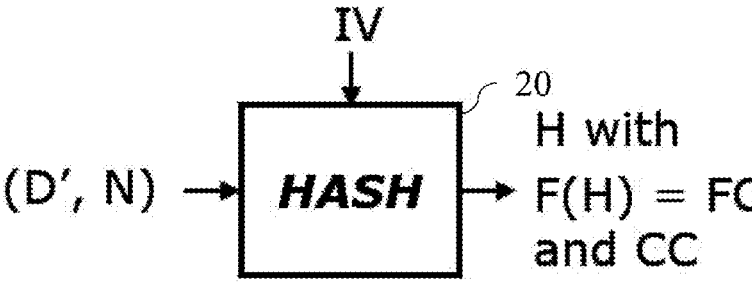
FIG. 3 shows a flow diagram for the schematic representation of a further example implementation.

As shown in FIG. 3, the method 100 additionally pro-
vides, for example, for a verification of the hash value H by
reference to a proof of resources employed for the genera-
tion of the hash value, e.g., a PoW relating to the generation
of the hash value H. To this end, the hash value H is checked
for the presence of a computational constraint (CC). In the
present case, for example, the computational constraint is
fulfilled, if the hash value H comprises a predefined number
of leading zeros or of another leading character. The value
N can then be selected such that the hash value fulfils both
FC and CC. A generation of N thus requires a computing
time which is dependent upon the selected stringency for the
fulfilment of CC and FC. Depending upon the application,
the generation of N for the verification of trustworthy data
can be executed during, or prior to a production of an
application of the present disclosure.

A person skilled in the art will understand that the
additional employment of a PoW provides a superior and
more flexible scalability of attack feasibility and, in practice,
can also be implemented in a different manner. In particular,
by the additional employment of a PoW, a stringency for the
fulfilment of the functional constraint can be reduced, whilst
maintaining the same level of security, which is also con-
ducive to simpler technical implementation, as described in
greater detail hereinafter.

In conjunction with the proposed method 100, in the
example applications, a specific distribution of information
between different memories can be applied.

Figure 4:
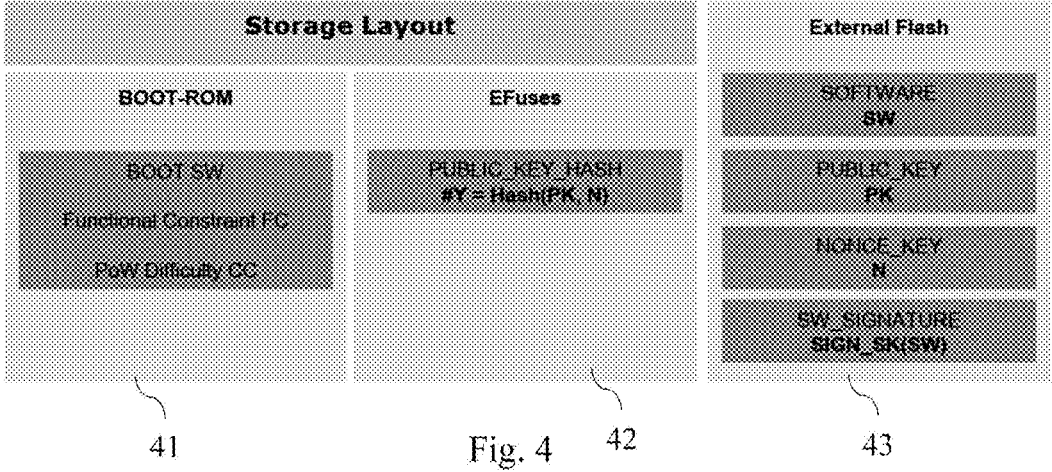
FIG. 4 shows a block diagram for the schematic representation of data storage in a further example implementation.

FIG. 4 shows a block diagram for the schematic repre-
sentation of an example storage of data and information in
conjunction with the proposed concept. As shown, in appli-
cations of the proposed method 100, various memories 41,
42 and 43 are provided for storage. In the present case, a
read-only memory 41 (or "ROM") is provided for the
storage of a boot software ("BOOT SW"), which executes
the boot-up process. In the present case, the read-only memory 41 is thus also described as the "Boot-ROM". In
addition to the boot software, on read-only memory 41, the
value FC of the functional constraint and the computational
constraint CC, or a value of the computational constraint, are
saved. As a person skilled in the art will appreciate, data in
the read-only memory 41 are not susceptible to manipulation
without further action, as a result of which the read-only
memory 41, in comparison with other memories, particu-
larly memories 42 and 43, can assume a higher degree of
hardware security or anti-manipulation security.

The memory 43 stores the software SW, which is to be
loaded during the boot-up process and, in the present case,
is embodied, for example, as a flash memory ("Flash-
EEPROM"). In addition to the software SW, in the present
case, a public key (PK) for the encryption of software SW,
the value N ("NONCE_KEY") and a software signature
SIGN_SK(SW) ("SW_SIGNATURE") are also saved in the
flash memory 43. For verification, based on PK and N, a
hash value #Y'=H(PK, N) is generated.

The memory 42 saves a reference #Y=H(PK, N) for
checking #Y'=H(PK, N) by a comparison of #Y and #Y'. The
memory 42 can be configured such that any modifications to
memory content are irreversible, e.g., modifications cannot
be executed in a reversible manner. In the present case, the
memory 42 comprises, for example, a plurality of electronic
fuses, or "eFuses" for saving the hash value. The reference
Y can thus be saved in the form of a circuit state of the
eFuse, which is only irreversibly modifiable. The eFuses can
change state, for example, from "0" to "1" only, but not vice
versa. #Y is thus only irreversibly modifiable, thus permit-
ting a more reliable detection of manipulations.

According to this application, it is provided, for example,
that the software SW for the boot-up process, according to
the method, is checked and loaded by the boot software
BOOT SW. In the present case, it is provided that the SW is
verified by the employment of the key PK. Potential attacks
can thus entail an intent to manipulate the key PK in order
to permit the introduction of illicit data or software. In
particular, the present disclosure thus provides an approach
for the verification of cryptographic keys, in order to coun-
teract such attacks.

For verification according to the method, for example, the
following steps are executed:

1) Calculation of #Y'=H(PK, N) based on the public key
   PK and the value N, which is saved in the flash memory
   43;
2) Calculation of #Z'=CountZeros(#Y'=H(PK, N),
   wherein #Z' indicates a total number of zeros in #Y';
3) Calculation of a (further) hash value Hash(PK, N),
   according to the computational constraint CC, as a
   proof-of work PoW, based on PK and N (optional)
4) Checking as to whether #Z'=FC is fulfilled, wherein
   FC, in the present example, indicates a predefined total
   number of zeros in H(PK, N);
5) Checking as to whether the PoW (Hash(PK, N)) fulfils
   the computational constraint CC (optional); and
6) Checking as to whether #Y'=#Y is fulfilled.

The software SW is then classified as trustworthy, and is
loaded from the flash memory 43 for the boot-up process, if
the conditions defined in steps 4), 5) and 6) are fulfilled.
Otherwise, the software SW is not classified as trustworthy,
and any loading of software is abandoned.

The proposed comparison of the hash value #Y' with #Y
in step 6) thus provides a comparison with physical and
irreversibly modifiable properties, namely, the circuit state
of the eFuse, as a result of which, in comparison with other approaches, a superior verification security or a reduced attack feasibility are provided.

The application of PoW (see step 5)) permits, for a consistent attack feasibility, a shorter character string or a shorter hash value #Y. Accordingly, for example, #Y requires a smaller storage capacity. By the application of a PoW, in the interests of reduced technical complexity and reduced costs, fewer eFuses are therefore required for storage purposes. The employment of a PoW thus permits an ideal compromise between a requisite chip surface area (for the eFuse) and computational resources for the fulfilment of the computational constraint. In practice, the computational constraint CC requires, for example, that the PoW comprises a predefined number of leading zeros. As shown in FIG. 3, the PoW thus corresponds to the character string, e.g., #Y'.

It should be observed that the procedure described is not limited to the employment of the public key PK and, alternatively or additionally, a software, a software representation, configuration data and/or similar can be employed.

Moreover, in the boot-up process, a plurality of character strings, e.g., a plurality of hash values, can also be checked by reference to functional constraints. In practice, during the boot-up process, for example, a plurality of components can be initialized, each of which can employ a dedicated key, and thus a dedicated character string or a dedicated hash value, for verification. Optionally, a plurality of hash values can also be verified for each component. The number of eFuses can thus be scaled to the number of character strings or hash values which are employed for verification, and are saved for this purpose in the eFuses.

A plurality of PoWs can also be provided, as described in greater detail hereinafter with reference to FIG. 5.

Figure 5:
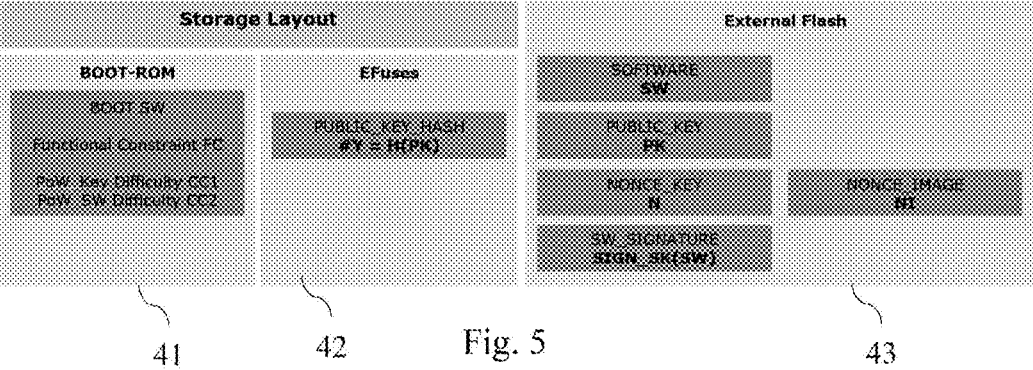
FIG. 5 shows a block diagram for the schematic representation of an example implementation having a plurality of PoWs.

As shown in FIG. 5, in addition to a first computational constraint CC1 (e.g., CC) which, as described heretofore, is employed for the verification of the hash value #Y' using a first PoW, (at least) one second computational constraint CC2 is employed for a second PoW. In addition to the verification of the key, in the present case, CC2 is applied, for example, for the verification of a software signature SW_SIGNATURE. In other example implementations, however, a further cryptographic key or other data/information, for example, can also be employed for this purpose. In the present case, the software signature SW_SIGNATURE comprises, for example, a further hash value SIGN_SK(SW, NI) ("Hash (SW, NI)"), which has been generated based on the software SW and an (arbitrary) representation NI of the value N.

Verification further comprises, for example, the following steps:

3a) Calculation of a (further) hash value Hash(SW, NI) as a proof-of-work PoW*, based on SW and NI; and 5a) Checking as to whether PoW*fulfils the computational constraint CC2.

The software SW will then be classified as trustworthy and loaded if CC2 is also fulfilled. Otherwise, any loading of the software SW will be abandoned.

A person skilled in the art will understand that, in the same way, additionally or alternatively, a further functional constraint ("FC2") can also be applied for verification.

Figure 6:
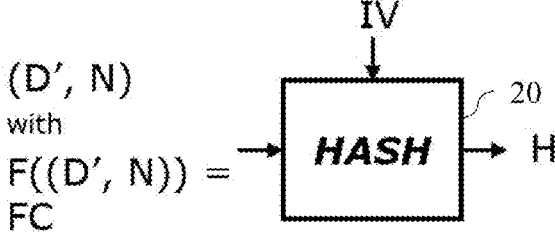
FIG. 6 shows a flow diagram for the schematic representation of a further example implementation.

A person skilled in the art will appreciate, moreover, that the functional constraint can not only be applied to the hash value for data or the key, but also to the data or key themselves. In the present case, the functional constraint can be applied e.g., to an input variable for the generation of the hash value, as described hereinafter with reference to FIG. 6.

With reference to the example according to FIGS. 2 and 3, the functional constraint can be applied, for example, to the data packet (D', N). Correspondingly, for the purposes of verification, for example, the Hamming weight of the data packet to be checked is compared for compliance with the Hamming weight, in accordance with the functional constraint. N is thus to be selected such that (D', N) corresponds to the functional constraint, and assumes, for example, the predefined Hamming weight.

Figures 7, 8:
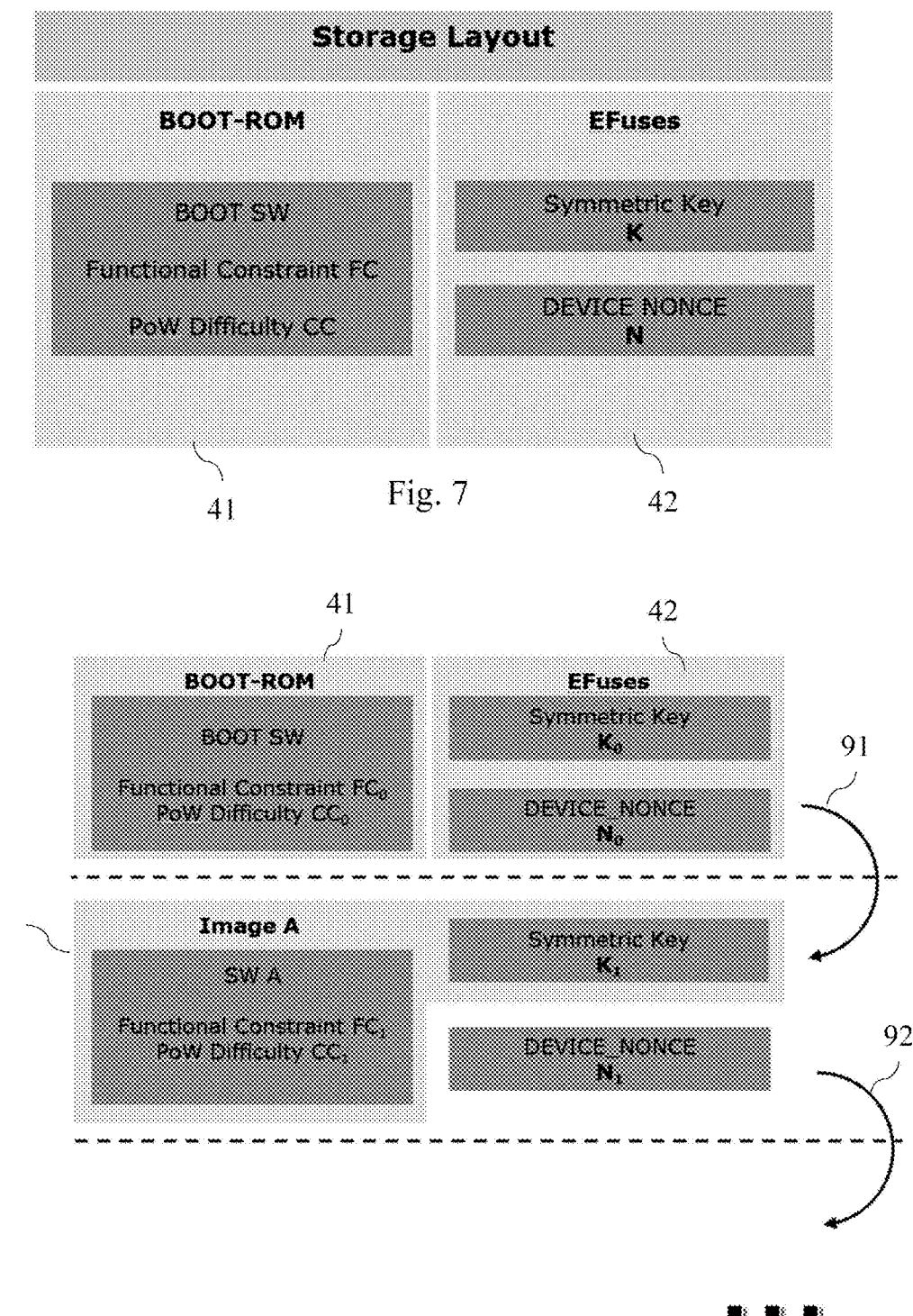
FIG. 7 shows a block diagram for the schematic representation of data storage in a further example implementation.
FIG. 8 shows a block diagram for the schematic representation of an application of an example implementation, in a sequential boot-up process.

Alternatively, for the purposes of verification, N and a cryptographic key can also be employed, as represented by reference to an example implementation according to FIG. 7.

According to the example implementation represented in FIG. 7, for example, a symmetric key K is employed, in combination with N, for verification purposes. To this end, as represented, K and N are saved in the memory 42. In the memory 41, for example, the boot software, FC and CC are additionally saved.

FC is defined, for example, in accordance with K and/or N. In the present example, the predefined value FC is defined for the total number of zeros, e.g., by the following relationship: FC:=floor(len(N)+len(K))/2). Optionally, any other definition of FC, in accordance with N and/or K, can be preferred.

Additionally, a PoW can be provided for verification purposes, wherein a hash value Hash(N, K) is checked for compliance with CC.

Verification then comprises, for example, the following steps:

1) Calculation of #Z', wherein #Z' indicates a total number of zeros in N and K combined;

2) Calculation of PoW=Hash(N, K) based on N and K (optional);

3) Checking as to whether #Z'=FC; and

4) Checking as to whether PoW=CC (optional).

In the event that 3), and optionally 4), are fulfilled, the software SW is loaded, and otherwise any loading of software SW is abandoned.

In the event that functional constraint is defined for the Hamming weight, it proceeds, from the assumption that n:=len(N), k:=len(K) and wt(K) is the Hamming weight of K (or wt(N) is the Hamming weight of N), for a constant value of FC, that n≥k, in order to cover all cases. It is proposed that n=k and that a setting of $$FC = \frac{n+k}{2} = n$$

be applied. The number of vectors for a given Hamming weight and a given length n is then given by: "n from k", such that:

$$C(n, k) = \frac{n!}{w!(n-w)!}$$

The number of potential values for N is then dependent upon the Hamming weight of K.

In the limiting cases (excluding cases in which K is binary, and contains only 1 or 0) wt(K)=k−1 and wt(K)=1, n values for N are then possible.

The computational constraint can be defined such that, for the fulfilment thereof for a given key K, it is necessary to define a value N such that H(K, N) fulfils the computational constraint and, in the event that the circuit states of eFuses can only be modified from $0$ to $1$, but not vice versa, for all other keys K', where $wt(K')>wt(K)$, and N', where $wt(N')>wt(N)$, the computational constraint is not fulfilled. In this case, an implementation with no additional eFuses for #Z(N, K) is possible. The margin of potential solutions for N' and K' will then be sufficiently large.

As described in greater detail with reference to FIG. 8, the proposed concept can be employed multiple times, for example during a boot-up process, e.g., at least once per step.

Corresponding to N, K, CC and FC, for this purpose, $K_0$, $N_0$, $CC_0$ and $FC_0$ can be saved and employed for verification in a first step 91 of the boot-up process, in order to load a software image A ("Image A"), which comprises a software A, a further functional constraint $FC_1$, a further computational constraint $CC_1$ and a further key $K_1$. In an analogous manner to the first step, $K_1$, $CC_1$ and $FC_1$, together with a further value $N_1$, are then employed in a further step 92 of the boot-up process for the verification of software SW A. $N_1$ can also be saved in the memory 42.

The concept proposed herein can be realized, for example, in applications for a vehicle, for example for the initialization of a vehicle component, such as the braking or steering system of the vehicle. Correspondingly, the method 100 can be executed by the vehicle. However, a person skilled in the art will appreciate that the proposed concept can also be employed, in an analogous manner, in other applications.

In practice, the proposed method 100 can be implemented in a computer program. Example implementations correspondingly provide for a computer program comprising commands which, upon the execution of the program by a computer, initiate the execution by the latter of the method/steps of a method according to one of the preceding claims.

As described in greater detail with reference to FIG. 9, the proposed concept can also be implemented in a device.

Figure 9:
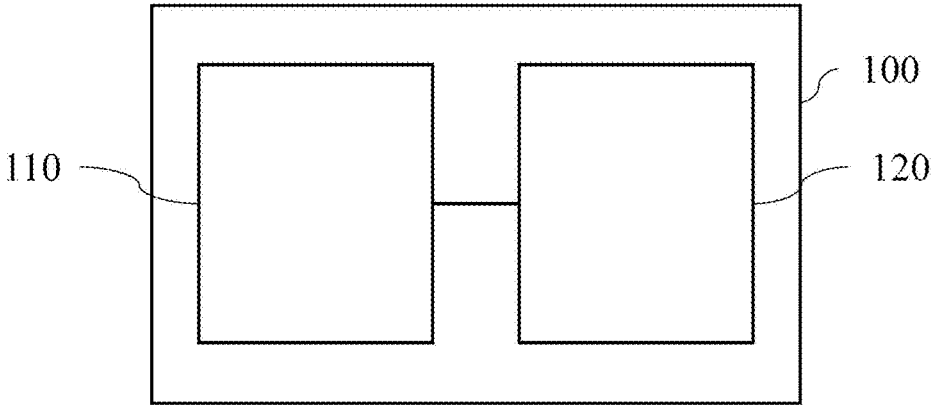
FIG. 9 shows a block diagram for the schematic representation of an example implementation of a device according to the present disclosure.

FIG. 9 shows a block diagram for the schematic representation of an example implementation of a device 100 for loading data during a boot-up process according to the present disclosure.

The device 100 comprises one or more communication interfaces 110, and a data processing circuit 120 which is configured, by the employment of the one or more interfaces 110, to execute a method according to the present disclosure.

The one or more interfaces 110 can be correspondingly configured for the reception of the character string and the loading of software. In practice, the interfaces 110 can comprise any hard-wired and/or wireless interface. In practice, the interfaces 110 can be configured as external interfaces and/or internal interfaces of the data processing circuit 120, e.g., in the form of a "socket" or "slot" in the data processing circuit. Alternatively, they can be configured as optical interfaces.

In practice, the data processing circuit 120 can comprise any programmable hardware. Examples of such programmable hardware can include, for example, a processor, a computer processor (CPU, or central processing unit), a graphics processor (GPU, or graphics processing unit), a computer, a computer system, an application-specific integrated circuit (ASIC), an integrated circuit (IC), a system-on-chip (SOC), a programmable logic element, or a field programmable gate array (FPGA) with a microprocessor.

For the execution of the proposed method 100, the data processing circuit 120 can be configured for the execution of a corresponding computer program. To this end, the computer program can be present on a (digital) storage medium, and retrieved therefrom. The device 100 can correspondingly comprise such a storage medium. The storage medium can thus be machine- or computer-readable. Some example implementations thus comprise a data medium having electronically-readable control signals, which are capable of cooperating with a programmable computer system or a programmable hardware component, such that a method described herein is executed. One example implementation is thus a data medium (or a digital storage medium, or a computer-readable medium), on which a program for the execution of one of the methods described herein is recorded. In some example implementations, the memory for saving the computer program, in the interests of protection against manipulations, is configured as a read-only memory.

As described in conjunction with the method 100, the device 100 can further comprise a digital memory having one or more electronic fuses for the storage of a reference for the verification of the character string.

In some example implementations, the device 100 described can be installed in a vehicle.

Aspects and features described in conjunction with one of the specific preceding examples can also be combined with one or more of the further examples, by way of a replacement of an identical or similar feature of the further example, or for the additional introduction of a feature into the further example.

It is understood that the disclosure of a plurality of steps, processes, operations or functions, as disclosed in the description or in the claims, does not compel the execution thereof in the sequence described, unless this is explicitly indicated in an individual case, or is absolutely necessary for technical reasons. Consequently, the preceding description does not limit the execution of multiple steps or functions to a specific sequence. Moreover, in further examples, an individual step, an individual function, an individual process or an individual operation can comprise and/or can be subdivided into a plurality of sub-steps, sub-functions, sub-processes or sub-operations.

Where, in the preceding paragraphs, certain aspects have been described in conjunction with a device or a system, these aspects are also to be understood as a description of the corresponding method. Thus, for example, a unit, a device, or a functional aspect of the device or of the system can correspond to a feature, for example to a process step, of the corresponding method. Correspondingly, aspects described in conjunction with a method are also to be understood as a description of a corresponding unit, a corresponding element, a property or a functional feature of a corresponding device or of a corresponding system.

The following claims are thus included in the detailed description, wherein each claim can represent a separate example per se. It should further be observed that—although a dependent claim may refer, in the claims, to a specific combination thereof with one or more other claims—other examples can also comprise a combination of the dependent claim with the subject matter of any other dependent or independent claim. Such combinations are thus explicitly proposed, unless it is indicated, in an individual case, that a particular combination is not intended. Moreover, the features of a claim are also considered to be included in any other independent claim, even if the claim is not defined as directly dependent upon the other independent claim.

The following provides an overview of some Aspects of the present disclosure:

Aspect 1: A method for loading data during a boot-up process, wherein the method comprises: receiving at least one character string for a verification of the data; verifying the data, including performing a comprehensive check of an entire character string of the at least one character string; and loading the data based on the comprehensive check of the entire character string.

Aspect 2: The method as recited in Aspect 1, wherein the entire character string comprises at least one of a cryptographic key for verifying the data or at least one predefined value for verifying the data.

Aspect 3: The method as recited in any of Aspects 1-2, wherein the entire character string comprises a data-specific hash value, and wherein performing the comprehensive check of the entire character string comprises performing a comprehensive check of the data-specific hash value.

Aspect 4: The method as recited in Aspect 3, wherein the hash value has been generated based on at least one of a cryptographic key for the data, data information with respect to the data, or configuration information with respect to the data.

Aspect 5: The method as recited in any of Aspects 1-4, wherein preforming the comprehensive check of the entire character string comprises performing a check as to whether the entire character string fulfils a predefined condition, and wherein loading the data proceeds only if the predefined condition is fulfilled.

Aspect 6: The method as recited in Aspect 5, wherein the predefined condition comprises a condition for a result of a predefined function which is applied to the entire character string.

Aspect 7: The method as recited in Aspect 6, wherein the predefined condition is fulfilled if the result deviates from a predefined comparative value for the result by no more than a predefined deviation.

Aspect 8: The method as recited in Aspect 5, wherein the predefined condition comprises at least one of a condition for a total number of a predefined character present in the entire character string or a condition for a number of characters of the entire character string within a predefined character group.

Aspect 9: The method as recited in Aspect 6, wherein the predefined function comprises a function for determining a Hamming weight of the entire character string, and wherein the predefined condition is fulfilled if the Hamming weight corresponds to a predefined value.

Aspect 10: The method as recited in any of Aspects 1-9, wherein the method further comprises: verifying the entire character string by referencing a proof of resources associated with a generation of the entire character string.

Aspect 11: The method as recited in Aspect 10, wherein the proof of resources is executed to an effect that the entire character string comprises a predefined number of a predefined leading character.

Aspect 12: The method as recited in any of Aspects 1-11, wherein the method is executed in a vehicle, and wherein the data is provided for operating a component of the vehicle.

Aspect 13: A non-transitory computer-readable medium comprising a computer program having a program code for causing a programmable hardware device to execute a method for loading data during a boot-up process of device, the method comprising: receiving at least one character string for a verification of the data; verifying the data, including performing a comprehensive check of an entire character string of the at least one character string; and loading the data based on the comprehensive check of the entire character string.

Aspect 14: A device for loading data during a boot-up process of the device, comprising: one or more communication interfaces; and a data processing circuit configured to utilize the one or more communication interfaces to execute a process for loading the data, including: receiving at least one character string for a verification of the data, verifying the data, including performing a comprehensive check of an entire character string of the at least one character string, and loading the data based on the comprehensive check of the entire character string.

Aspect 15: The device as recited in Aspect 14, wherein the data processing circuit comprises a memory for storing a computer program for executing the process for loading the data.

Aspect 16: The device as recited in Aspect 15, wherein the memory is configured as a read-only memory.

Aspect 17: The device as recited in any of Aspects 14-16, wherein the device comprises a digital memory having one or more digital fuses for storing a reference for checking the entire character string.

Aspect 18: The device as recited in any of Aspects 14-17, wherein the device is integrated in a vehicle, and the data is provided for operating a component of the vehicle.

Aspect 19: A system configured to perform one or more operations recited in one or more of Aspects 1-18.

Aspect 20: An apparatus comprising means for performing one or more operations recited in one or more of Aspects 1-18.

Aspect 21: A non-transitory computer-readable medium storing a set of instructions, the set of instructions comprising one or more instructions that, when executed by a device, cause the device to perform one or more operations recited in one or more of Aspects 1-18.

Aspect 22: A computer program product comprising instructions or code for executing one or more operations recited in one or more of Aspects 1-18.

The invention claimed is:

1. A method for loading data during a boot-up process, wherein the method comprises:
   receiving at least one character string for a verification of the data;
   verifying the data, including performing a comprehensive check of an entire character string of the at least one character string; and
   loading the data based on the comprehensive check of the entire character string,
   wherein performing the comprehensive check of the entire character string comprises performing a check as to whether the entire character string fulfils one or more predefined conditions,
   wherein the one or more predefined conditions comprises a condition for a result of one or more predefined functions which is applied to the entire character string, the one or more predefined functions comprising a function for determining a Hamming weight of the entire character string,
   wherein the one or more predefined conditions are fulfilled if the Hamming weight corresponds to a predefined value, and
   wherein loading the data proceeds only if the one or more predefined conditions are fulfilled.

2. The method as claimed in claim 1, wherein the entire character string comprises at least one of a cryptographic key for verifying the data or at least one predefined value for verifying the data.

3. The method as claimed in claim 1, wherein the entire character string comprises a data-specific hash value, and
   wherein performing the comprehensive check of the entire character string comprises performing a comprehensive check of the data-specific hash value.

4. The method as claimed in claim 3, wherein the data-specific hash value has been generated based on at least one of a cryptographic key for the data, data information with respect to the data, or configuration information with respect to the data.

5. The method as claimed in claim 1, wherein the one or more predefined functions comprises another function for determining a function result of the entire character string, and wherein the one or more predefined conditions are fulfilled if the function result deviates from a predefined comparative value for the result by no more than a predefined deviation.

6. The method as claimed in claim 1, wherein the one or more predefined conditions comprises at least one of a condition for a total number of a predefined character present in the entire character string or a condition for a number of characters of the entire character string within a predefined character group.

7. The method as claimed in claim 1, wherein the method further comprises:
  verifying the entire character string by referencing a proof of resources associated with a generation of the entire character string.

8. The method as claimed in claim 7, wherein the proof of resources is executed to an effect that the entire character string comprises a predefined number of a predefined leading character.

9. The method as claimed in claim 1, wherein the method is executed in a vehicle, and
  wherein the data is provided for operating a component of the vehicle.

10. The method as claimed in claim 1, wherein the one or more predefined conditions are fulfilled if the Hamming weight is equal to the predefined value.

11. The method as claimed in claim 1, wherein the entire character string comprises a data-specific hash value,
  wherein performing the comprehensive check of the entire character string comprises performing a comprehensive check of the data-specific hash value, and
  wherein verifying the entire character string by referencing a proof of resources associated with a generation of the data-specific hash value, including checking the data-specific hash value for a computational constraint, the computational constraint being fulfilled based on the data-specific hash value having a predefined number of a predefined leading character.

12. A non-transitory computer-readable medium comprising a computer program having a program code for causing a programmable hardware device to execute a method for loading data during a boot-up process of device, the method comprising:
  receiving at least one character string for a verification of the data;
  verifying the data, including performing a comprehensive check of an entire character string of the at least one character string; and
  loading the data based on the comprehensive check of the entire character string, wherein performing the comprehensive check of the entire character string comprises performing a check as to whether the entire character string fulfils one or more predefined conditions,
  wherein the one or more predefined conditions comprises a condition for a result of one or more predefined functions which is applied to the entire character string, the one or more predefined functions comprising a function for determining a Hamming weight of the entire character string,
  wherein the one or more predefined conditions are fulfilled if the Hamming weight corresponds to a predefined value, and
  wherein loading the data proceeds only if the one or more predefined conditions are fulfilled.

13. A device for loading data during a boot-up process of the device, comprising:
  one or more communication interfaces; and
  a data processing circuit configured to utilize the one or more communication interfaces to execute a process for loading the data, including:
    receiving at least one character string for a verification of the data,
    verifying the data, including performing a comprehensive check of an entire character string of the at least one character string, and
    loading the data based on the comprehensive check of the entire character string,
    wherein performing the comprehensive check of the entire character string comprises performing a check as to whether the entire character string fulfils one or more predefined conditions,
    wherein the one or more predefined conditions comprises a condition for a result of one or more predefined functions which is applied to the entire character string, the one or more predefined functions comprising a function for determining a Hamming weight of the entire character string,
    wherein the one or more predefined conditions are fulfilled if the Hamming weight corresponds to a predefined value, and
    wherein loading the data proceeds only if the one or more predefined conditions are fulfilled.

14. The device as claimed in claim 13, wherein the data processing circuit comprises a memory for storing a computer program for executing the process for loading the data.

15. The device as claimed in claim 14, wherein the memory is configured as a read-only memory.

16. The device as claimed in claim 13, wherein the device comprises a digital memory having one or more digital fuses for storing a reference for checking the entire character string.

17. The device as claimed in claim 13, wherein the device is integrated in a vehicle, and the data is provided for operating a component of the vehicle.

* * * * *